(12) United States Patent
Kobayashi et al.

(10) Patent No.: US 8,546,013 B2
(45) Date of Patent: Oct. 1, 2013

(54) CYLINDRICAL BATTERY AND METHOD OF MANUFACTURING THE SAME

(75) Inventors: Keiichiro Kobayashi, Toyota (JP); Akira Kiyama, Toyota (JP); Kazuyuki Kusama, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 371 days.

(21) Appl. No.: 12/992,271

(22) PCT Filed: Apr. 22, 2009

(86) PCT No.: PCT/JP2009/057950
§ 371 (c)(1),
(2), (4) Date: Nov. 12, 2010

(87) PCT Pub. No.: WO2009/145017
PCT Pub. Date: Dec. 3, 2009

(65) Prior Publication Data
US 2011/0081566 A1    Apr. 7, 2011

(30) Foreign Application Priority Data
May 30, 2008   (JP) .................................. 2008-142372

(51) Int. Cl.
*H01M 2/02*   (2006.01)
(52) U.S. Cl.
USPC .............................. 429/164; 429/94; 429/185
(58) Field of Classification Search
None
See application file for complete search history.

(56) References Cited

U.S. PATENT DOCUMENTS

| 2001/0049054 | A1  | 12/2001 | Enomoto et al. |
| 2003/0104276 | A1* | 6/2003  | Mizuno et al. ................. 429/181 |
| 2003/0124420 | A1* | 7/2003  | Fong et al. ..................... 429/181 |
| 2004/0023107 | A1* | 2/2004  | Nakanishi et al. ............. 429/161 |
| 2005/0079413 | A1* | 4/2005  | Schubert ........................ 429/185 |
| 2005/0100785 | A1  | 5/2005  | Enomoto et al. |
| 2007/0160904 | A1* | 7/2007  | Uh ................................. 429/174 |

FOREIGN PATENT DOCUMENTS

| CA | 2 348 230 A1 | 11/2001 |
| EP | 1 160 893 A2 | 12/2001 |
| JP | 6-111796     | 4/1994  |
| JP | 10-302745    | 11/1998 |
| JP | 11-25950     | 1/1999  |
| JP | 2000-251875  | 9/2000  |
| JP | 2002-216716  | 8/2002  |
| JP | 2002-358945  | 12/2002 |
| JP | 2003-77449   | 3/2003  |

OTHER PUBLICATIONS

International Search Report in International Application No. PCT/JP2009/057950: Mailing Date: Jul. 21, 2009.

* cited by examiner

*Primary Examiner* — Patrick Ryan
*Assistant Examiner* — Jose Colucci Rios
(74) *Attorney, Agent, or Firm* — Finnegan, Henderson, Farabow, Garrett & Dunner, LLP (57) ABSTRACT

A cylindrical battery is formed by sealing an electrode wound body in a cylindrical case and having an outer terminal member mounted to one end of the battery so as to axially penetrate through a gasket having a cylindrical portion and collar portions. A neck is formed at the inner surface of the case. A flange having an outer diameter greater than the inner diameter of the neck is formed on the outer terminal member. To mount the outer terminal member to the case, the gasket is mounted to the flange, liquid is charged from a through-hole with the flange held in a temporarily sealed state in which the flange is pressed into the case until being in contact with the neck, and an end portion of the case is bent to the inner surface side thereof to press the collar portion to the flange to complete sealing.

5 Claims, 9 Drawing Sheets

CYLINDRICAL BATTERY AND METHOD OF MANUFACTURING THE SAME

CROSS-REFERENCE TO RELATED APPLICATIONS

This is a national phase application filed under 35 U.S.C. 371 of PCT/JP2009/057950 filed on Apr. 22, 2009, which claims the benefit of priority from the prior Japanese Patent Application No. 2008-142372 filed on May 30, 2008, the entire contents of all of which are incorporated herein by reference.

TECHNICAL FIELD

The present invention relates to a cylindrical battery in which a power generating element made of an electrode band wound in a columnar form is contained in a cylindrical case and a method of manufacturing the cylindrical battery. More particularly, the present invention relates to a cylindrical battery with improved air releasing property during liquid injection in a manufacturing process and a method of manufacturing the cylindrical battery.

BACKGROUND ART

Heretofore, there has been utilized a secondary battery including a positive electrode band and a negative electrode band, both being overlapped and wound together. As such a secondary battery, there is a cylindrical battery including electrode bands wound in circular columnar form and contained in a cylindrical case. For example, some cylindrical batteries to be used in a vehicle (especially HV and EV) are designed in a slender form because of the necessity to be mounted therein. Conventional examples of the cylindrical battery are disclosed in Patent Literatures 1 and 2. In this type of cylindrical battery, an end of the cylindrical case is closed by a cover member whereby the inside of the cylindrical case is separated from the outside. At the center of the cover member, a terminal connected to one of the electrode bands is provided.

CITATION LIST

Patent Literature

Patent Literature 1: JP 2000-251875A
Patent Literature 2: JP 2003-77449A

SUMMARY OF INVENTION

Technical Problem

However, the conventional cylindrical battery has a problem that electrolyte is hard to pour or inject in the manufacturing process. In the case of the cylindrical battery, electrolyte injection in and air discharge (release) out of the battery during liquid injection are performed through an end surface of the battery, not a periphery surface. Further, one of end surfaces is normally hermetically closed during liquid injection and hence only the other end surface is available as a path for liquid injection and air discharge. The end surface is partly occupied by the aforementioned terminal. In other words, a very restricted part of an entire surface area of the cylindrical battery can only be used as the path for liquid injection and air discharge. Accordingly, the cylindrical battery is apt to cause troubles in a liquid injection process. In some cases, the inside of the cylindrical case is evacuated before liquid injection, but yet air is likely to remain therein. Thus, an air discharging path is required during liquid injection.

To address this problem, for example, it is conceivable that liquid injection is performed before attachment of the cover member and then the cover member is attached. This is because almost the entire area of the end surface is open until the cover member is attached. However, in this configuration, the terminal is inevitably made of two components: an inner member and an outer member. A process of joining them is thus required. This results in low reliability and low productivity. It is therefore preferable that the terminal is made of a single component configured to penetrate through the cover member (e.g., Patent Literature 2). In such a case, the cover member has to be attached before liquid injection. This causes the problem with liquid injection. The technique in Patent Literature 1 is also made to improve liquid injection property. However, the principal object of the above techniques is to make electrolyte to reach a central area in a longitudinal direction. This is not a solution for the air discharge property.

The present invention has been made in view of the circumstances to solve the above problems in the conventional cylindrical battery and has a purpose to provide a cylindrical battery with improved air releasing property during liquid injection in a manufacturing process.

Solution to Problem

One referential configuration related to the invention provides a cylindrical battery comprising a power generating element constituted of a positive electrode band and a negative electrode band wound in a columnar shape and contained in a cylindrical case, a terminal member connected to one of the electrode bands of the power generating element, and a flexible seal member that seals the clearance between the cylindrical case and the terminal member while insulating the cylindrical case from the terminal member, the terminal member and the seal member being arranged at one end of the cylindrical case and the terminal member being placed to extend through the seal member in an axial direction, wherein the cylindrical case is formed with a first protrusion on an inner surface, the terminal member is formed with a flange on a side surface located more outside in an axial direction than the first protrusion, the flange having an outer diameter larger than an inner diameter of the first protrusion, and an injection port extending through in the axial direction of the cylindrical case, the seal member includes: a large-diameter cylindrical portion located between the inner surface of the cylindrical case more outside in the axial direction than the first protrusion and a periphery surface of the flange; and a collar portion formed to continuously extend radially inward from the large-diameter cylindrical portion and located between a surface of the first protrusion located outside in the axial direction and a surface of the flange located inside in the axial direction; and a portion of the cylindrical case located on an end side relative to the first protrusion is bent so that the bent portion presses a part of the seal member against the flange to seal the one end of the cylindrical case.

Another aspect of the invention provides a method of manufacturing a cylindrical battery, in which the method comprises: when the terminal member is to be mounted in an opening of the cylindrical case at an end, placing the seal member between the cylindrical case and the terminal member so that the collar portion is located between a surface of the first protrusion located outside in the axial direction and a surface of the flange located inside in the axial direction and the large-diameter cylindrical portion is located between the inner surface of the cylindrical case and the periphery surface of the flange, injecting electrolyte in the cylindrical case in that state through the injection port, and then bending a portion of the cylindrical case located on an end side relative to the first protrusion to the inner surface side so that the bent portion presses a part of the seal member against the flange to seal the one end of the cylindrical case.

In the above manufacturing method, the liquid injection is performed in a temporarily sealed state prior to final sealing. Since final sealing is not yet conducted during liquid injection, air is smoothly discharged out of the cylindrical case. Air releasing property during liquid injection is thus excellent and also the impregnating ability of electrolyte to a power generating element is good. The final sealing can be completed by simply bending the cylindrical case after liquid injection, leading to good workability.

In the cylindrical battery in another referential configuration related to the invention, the seal member includes collar portions at two places in the axial direction of the cylindrical case, the collar portion placed inside in the axial direction is placed between the surface of the first protrusion located outside in the axial direction and the surface of the flange located inside in the axial direction, and the collar portion placed outside in the axial direction is pressed against the flange by the bent portion. The manufacturing method of the cylindrical battery in one aspect of the invention comprises: injecting the electrolyte while discharging air through a clearance between an outer surface of the seal member and the inner surface of the cylindrical case while the surface of the flange located inside in the axial direction is in contact with the surface of the first protrusion located outside in the axial direction through one of the collar portions; and bending the cylindrical case after injection to sandwich the other collar portion between the bent portion and a surface of the flange located outside in the axial direction.

In the cylindrical battery in another referential configuration related to the invention, the seal member includes: a small-diameter cylindrical portion having a smaller diameter than the large-diameter cylindrical portion, the small-diameter cylindrical portion being formed to continuously extend from the collar portion inward in the axial direction of the cylindrical case, and a third protrusion having a larger outer diameter than the inner diameter of the first protrusion, the second protrusion being arranged on an outer surface of the small-diameter cylindrical portion at a position more inside in the axial direction than the first protrusion, a part of the large-diameter cylindrical portion is folded and pressed against the flange by the bent portion, at least one of the first protrusion and the third protrusion is formed in circumferentially uneven shape, and the first protrusion and the third protrusion have shapes allowing partial contact with each other when the seal member is moved in the axial direction of the cylindrical case and also forming a clearance partially even when they are in contact with each other.

The manufacturing method of the cylindrical battery in one aspect of the invention includes: injecting the electrolyte while discharging air in the cylindrical case through a clearance between the second protrusion and the first protrusion after the terminal member is pushed axially inward until the second protrusion makes contact with the first protrusion, further pushing the terminal member axially inward after injection to make the second protrusion and the first protrusion to go over each other, and bending the cylindrical case so that a bent portion folds a part of the large-diameter cylindrical portion to press against the flange to complete sealing.

In this configuration, the state where the terminal member is pushed axially inward until the second protrusion makes contact with the first protrusion is defined as a temporarily sealed state. Since at least one of the first protrusion and the second protrusion has an uneven form in the circumferential direction, the clearance is generated between the second protrusion and the first protrusion in this temporarily sealed state. During liquid injection, accordingly, air is discharged through this clearance. Furthermore, when the cylindrical case is bent for final sealing after liquid injection, the second protrusion prevents lowering of the sealing property. This is because when the large-diameter cylindrical portion is also folded together with the end portion of the cylindrical case during the final sealing, contact of the second protrusion with the first protrusion restrains the small-diameter cylindrical portion from becoming deformed by the stress.

Furthermore, in the cylindrical battery in the invention, the seal member includes a second protrusion having a smaller inner diameter than the outer diameter of the flange, the second protrusion being arranged on an inner surface of the large-diameter cylindrical portion at a position more outside in the axial direction than the flange, a part of the large-diameter cylindrical portion is folded and pressed against the flange by the bent portion, the second protrusion is formed to be uneven in a circumferential direction, and the flange and the second protrusion have shapes allowing partial contact with each other when the seal member is moved in the axial direction of the cylindrical case before the cylindrical case is bent and also forming a clearance partially even when they are in contact with each other.

The manufacturing method thereof includes: injecting the electrolyte while discharging air through a clearance between the flange and the second protrusion after the terminal member is pushed axially inward until the flange makes contact with the second protrusion, further pushing the terminal member axially inward after injection to make the flange and the second protrusion to go over each other, and bending the cylindrical case so that a bent portion folds a part of the large-diameter cylindrical portion to press against the flange to complete sealing.

In this configuration, the state where the terminal member is pushed axially inward until the flange makes contact with the second protrusion is defined as a temporarily sealed state. Since the second protrusion has an uneven form in the circumferential direction, the clearance is generated between the flange and the second protrusion in this temporarily sealed state. During of liquid injection, accordingly, air is discharged through this clearance.

In the above configured cylindrical battery, furthermore, the flange is formed, on an axially outside surface, with an engagement configuration engageable with the second protrusion, and the second protrusion is in engagement with the engagement configuration. The manufacturing method in this case comprises bending the cylindrical case in the final sealing step to make the second protrusion engage with the engagement configuration. In this way, the engagement between the second protrusion and the engagement configuration can prevent rotation of the terminal member with respect to the cylindrical case.

Advantageous Effects of Invention

According to the invention, a cylindrical battery with improved air releasing property during liquid injection in the manufacturing process and a method of manufacturing the same.

DESCRIPTION OF EMBODIMENTS

A detailed description of a preferred embodiment of a cylindrical battery and a manufacturing method thereof embodying the present invention will now be given referring to the accompanying drawings. The cylindrical battery in each embodiment mentioned below is a secondary battery including a power generating element constituted of an electrode wound body made by winding a positive electrode band and a negative electrode band and impregnating them with electrolyte.

First Embodiment

Figure 1:
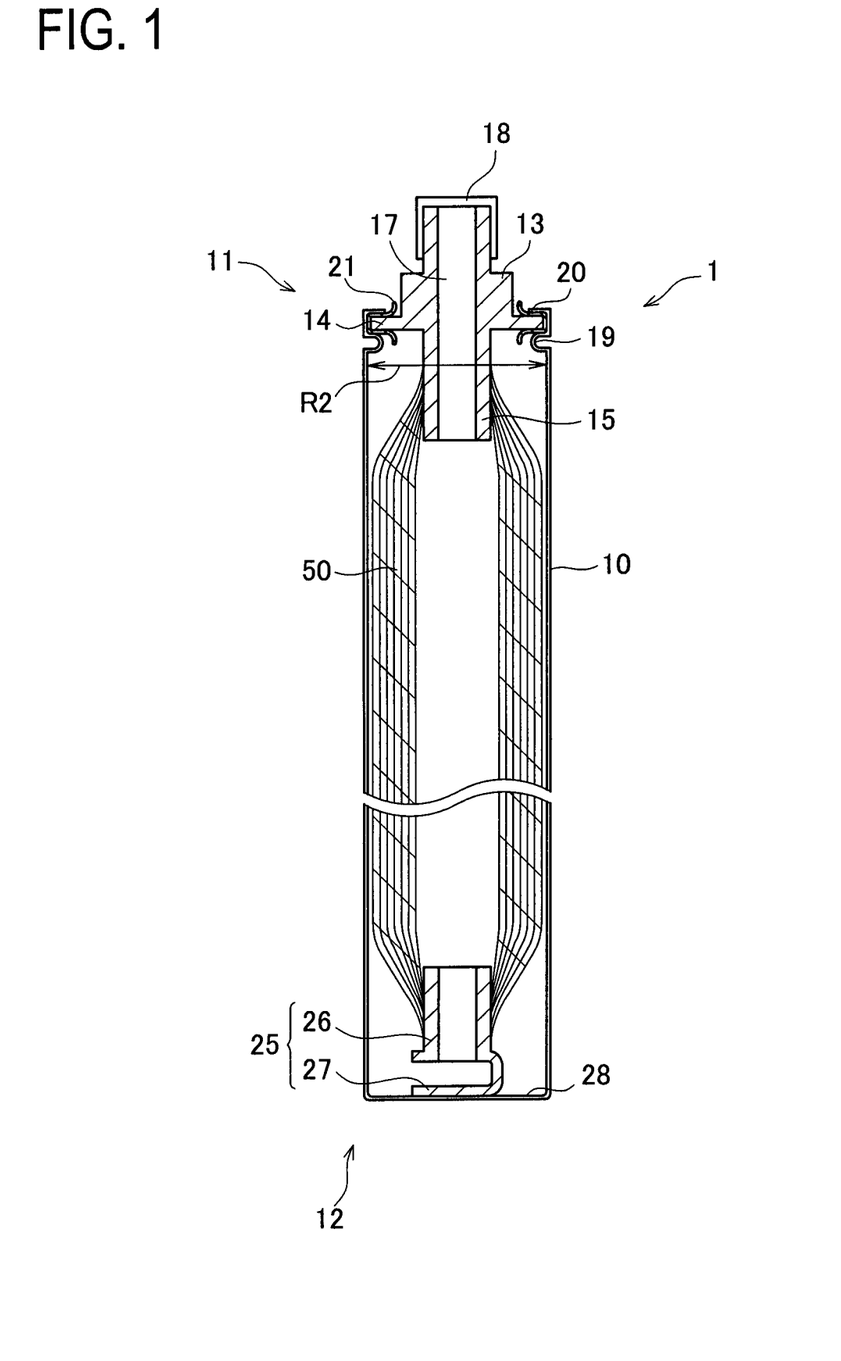
FIG. 1 is a sectional view showing a configuration of a cylindrical battery in a first embodiment.

A cylindrical battery in a first embodiment is configured as shown in FIG. 1. The cylindrical battery 1 shown in FIG. 1 is arranged such that an electrode wound body 50 is contained in a circular cylindrical case 10. An upper end 11 of the cylindrical case 10 is an originally open end portion that is closed later. A lower end 12 of the cylindrical case 10 is a closed end. The electrode wound body 50 is constituted of a positive electrode band and a negative electrode band wound in a circular cylindrical form, not in a flat form.

An outer terminal member 13 is attached to the upper end 11 of the cylindrical case 10. The outer terminal member 13 is a component one end of which is located in the cylindrical case 10 and connected to one of the positive and negative electrode bands constituting the electrode wound body 50 and the other end of which protrudes outside the cylindrical case 10 for external connection. The outer terminal member 13 in this embodiment is not an assembly of two or more components but an integral component extending from the inside of the cylindrical case 10 to the outside.

Figure 2:
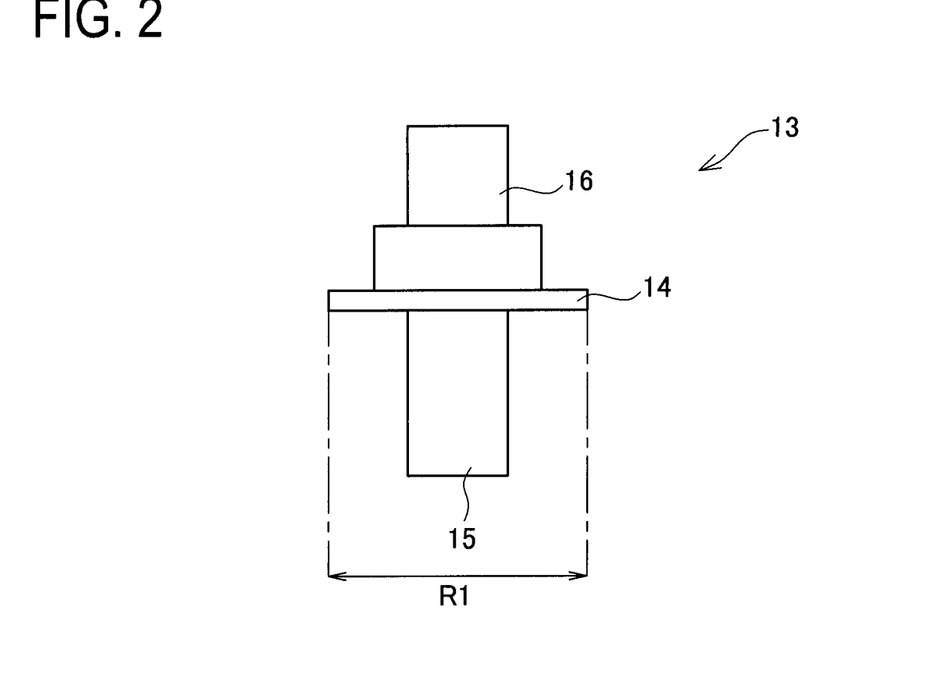
FIG. 2 is a front view showing a terminal member in the cylindrical battery in FIG. 1.

The outer terminal member 13 shown in FIG. 2 includes a flange 14, an inside part 15, and an outside part 16. The inside part 15 is connected to the electrode wound body 50 inside the cylindrical case 10. The outside part 16 serves for external connection outside the cylindrical case 10. The flange 14 has a disc shape located between the inside part 15 and the outside part 16. The flange 14 has an outer diameter R1 smaller than an inner diameter R2 of the cylindrical case 10 (see FIG. 1). The inside part 15 and the outside part 16 each have a diameter smaller than the flange 14.

As seen in FIG. 1, furthermore, the outer terminal member 13 is centrally formed with a through hole 17. The through hole 17 extends through the outer terminal member 13 in an axial direction thereof. The through hole 17 in the inside part 15 is open into the electrode wound body 50 and that in the outside part 16 is open outside. However, in FIG. 1, a cap 18 covers the outside part 16 to close an opening of the through hole 17 in the outside part 16. The through hole 17 is a hole through which electrolyte for impregnation of the electrode wound body 50 is injected in the manufacturing process of the cylindrical battery 1.

Near the upper end 11 of the cylindrical case 10 in FIG. 1, a neck 19 is formed. The neck 19 is a part of the cylindrical case 10 plastically deformed circularly inward and has an inner diameter R3 (see FIG. 4) smaller than the outer diameter R1 of the flange 14. The neck 19 in a state of FIG. 1 is located under the flange 14 of the outer terminal member 13. Specifically, when viewed in the axial direction of the cylindrical case 10, the neck 19 is located inside than the flange 14. A top end of the cylindrical case 10 on the upper end 11 side is bent radially inward, forming a bent portion 20. The bent portion 20 is located more outside than the flange 14 in the axial direction.

Figure 3:
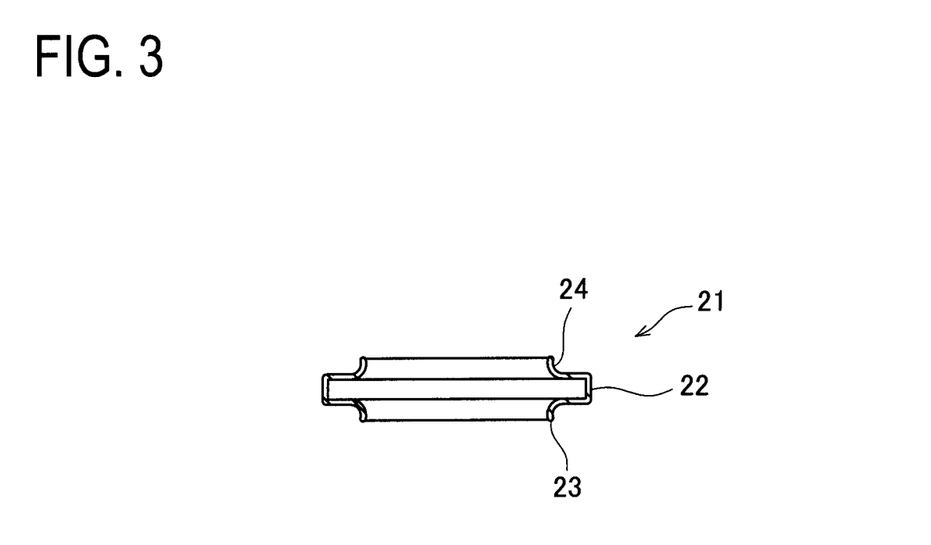
FIG. 3 is a sectional view showing a gasket in the cylindrical battery in FIG. 1.

A gasket 21 is held between the flange 14 and the cylindrical case 10. The gasket 21 is a flexible member and, as shown in FIG. 3, includes a cylindrical portion 22 and collar portions 23 and 24. The cylindrical portion 22 is located between a periphery surface of the flange 14 and an inner surface of the cylindrical case 10. The collar portion 23 is located between a lower surface of the flange 14 in FIG. 1 and the neck 19. The collar portion 24 is located between an upper surface of the flange 14 in FIG. 1 and the bent portion 20.

An inner terminal member 25 is built in the cylindrical case 10 near the lower end 12. The inner terminal member 25 includes a cylindrical portion 26 and a pressure contact portion 27. The cylindrical portion 26 is connected to one of the positive and negative electrode bands constituting the electrode wound body 50, the one being not connected to the outer terminal member 13. The pressure contact portion 27 is placed in pressure contact with an inner surface 28 of the lower end 12 of the cylindrical case 10. Thus, the outer terminal member 13 and the cylindrical case 10 externally serve as positive and negative electrodes of the cylindrical battery 1. It is to be noted that the lower end 12 of the cylindrical battery 1 shown in FIG. 1 is a fully hermetically closed type but not limited thereto. Even a configuration including a safety valve at a lower end is included in the scope of the term "seal" recited in the invention.

A process of manufacturing the cylindrical battery 1 shown in FIG. 1 will be explained below. In the manufacturing process in this embodiment, the followings are prepared in advance:

Winding electrode body 50 connected with the outer terminal member 13 and the inner terminal member 25, but not yet impregnated with electrolyte;

Gasket 21;

Cylindrical case 10 not yet formed with the neck 19 and the bent portion 20;

Electrolyte; and

Cap 18.

In this embodiment, the cylindrical battery 1 is generally manufactured in the following sequence.

Temporary Sealing→Liquid Injection→Final Sealing (Temporary Sealing)

Firstly, the gasket 21 is attached to the flange 14 of the outer terminal member 13. The electrode wound body 50 is inserted in the cylindrical case 10 in such a way that the inner terminal member 25 first enters the cylindrical case 10. The electrode wound body 50 is entirely placed more inside than a portion of the cylindrical case 10 at which the neck 19 is to be formed. However, the flange 14 of the outer terminal member 13 is placed more outside in the axial direction than the portion to be formed into the neck 19. At that time, the pressure contact portion 27 of the inner terminal member 25 is in contact with the inner surface 28 of the lower end 12 of the cylindrical case 10.

The neck 19 is then formed in the cylindrical case 10 in the above state by press. The neck 19 is made in a position between the electrode wound body 50 and the flange 14. In the manufacturing process in this embodiment, the cylindrical case 10 formed with the neck 19 is finally used. At that time, the inner diameter R3 of the neck 19 is determined to be smaller than the outer diameter R1 of the flange 14. After formation of the neck 19, the outer terminal member 13 is further pushed axially inward into the cylindrical case 10. Then, the outer terminal member 13 is stopped when the flange 14 contacts with the neck 19. At that time, the outer terminal member 13 should not be pressed so strongly.

Figure 4:
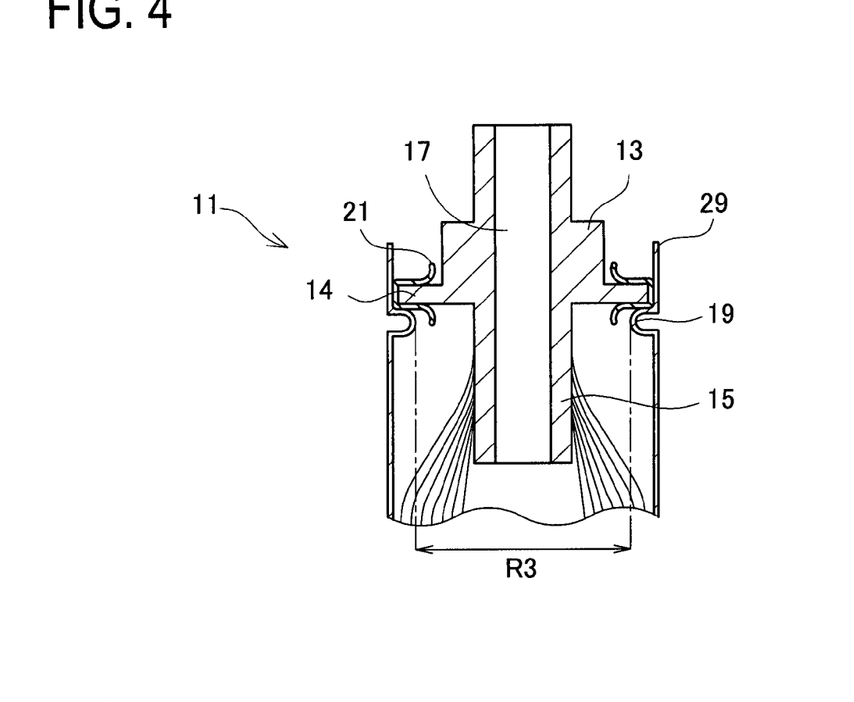
FIG. 4 is a sectional view showing a temporarily sealed state of the cylindrical battery in FIG. 1 in the manufacturing process.

The vicinity of the upper end 11 in this state is shown in FIG. 4. In the state of FIG. 4, the gasket 21 is held between the flange 14 of the outer terminal member 13 and the cylindrical case 10. To be more specific, the collar portion 23 of the gasket 21 is held between the lower surface of the flange 14 in the figure and an upper surface of the neck 19 in the figure. Furthermore, the cylindrical portion 22 of the gasket 21 is sandwiched between the periphery surface of the flange 14 and the inner surface of a portion of the cylindrical case 10 upper than the neck 19.

The outer terminal member 13 in this state is being lightly fixed to the upper end 11 of the cylindrical case 10 but unlikely to easily detach from the cylindrical case 10. However, the inner surface of the cylindrical case 10 and the gasket 21 do not make firm contact with each other. If the internal pressure of the cylindrical case 10 rises, therefore, air is allowed to release through clearances between the inner surface of the cylindrical case 10 and the gasket 21. That is, this state indicates that the temporary sealing is finished but the final sealing is not yet performed.

(Liquid Injection)

Liquid injection is carried out in the above state. Specifically, an electrolyte is injected into the cylindrical case 10 through the through hole 17 of the outer terminal member 13 in FIG. 4. The injected electrolyte first enters in the electrode wound body 50 and then gets impregnated in between the electrode bands. Accordingly, the air present in the cylindrical case 10 is caused to release outside through the clearances between the inner surface of the cylindrical case 10 and the gasket 21.

As described above, the outer terminal member 13 in such a state is simply at rest by contact with the neck 19 but does not completely sealingly close the upper end 11 of the cylindrical case 10. Therefore, when the internal pressure of the cylindrical case 10 rises, clearances are generated between the inner surface of the cylindrical case 10 and the gasket 21, thereby allowing the air to escape. Further, the clearances between the inner surface of the cylindrical case 10 and the gasket 21 over the entire circumference can serve as an air escape path. This can provide an excellent air releasing property during liquid injection and achieve smooth liquid injection. Accordingly, the electrolyte impregnating ability between the electrode bands is also good.

The internal pressure of the cylindrical case 10 may be reduced in advance before the liquid injection. Even in this case, some air still remains. Thus, the excellent air releasing property achieved by this embodiment is significant.

(Final Sealing)

Final sealing is conducted after the liquid injection. To be specific, the upper end portion 29 of the cylindrical case 10 in FIG. 4 is bent radially inward. This is so called bending. The upper end portion 29 of the cylindrical case 10 thus forms the bent portion 20 in FIG. 1. In this state after bending, the bent portion 20 presses the collar portion 24 of the gasket 21 against the upper surface of the flange 14 of the outer terminal member 13 in the figure. This also presses the outer terminal member 13 itself against the neck 19.

Consequently, the outer terminal member 13 and the gasket 21 make firm contact with each other. The gasket 21 and the inner surface of the cylindrical case 10 also make firm contact with each other. Thus, the gap between the outer terminal member 13 and the cylindrical case 10 is sealed at the upper end 11. This is final sealing. After that, the outside part 16 of the outer terminal member 13 is covered with the cap 18, thereby sealing the through hole 17. Afterward the electrolyte is no longer allowed to leak out of the cylindrical case 10. The cylindrical battery 1 in this embodiment is completed as above.

In this embodiment explained above in detail, the neck 19 is formed in the cylindrical case 10. Further, liquid injection is performed in the temporarily sealed state where the outer terminal member 13 has been pushed until making contact with the neck 19, and then the final sealing is conducted. Such liquid injection in the temporarily sealed state enables air escape paths to be created. Furthermore, the outer terminal member 13 being a single component requires no additional joining process. Thus, productivity and reliability are high. As above, the cylindrical battery 1 and the manufacturing method thereof can be realized with both excellent liquid injection property and high productivity.

Second Embodiment

Figure 5:
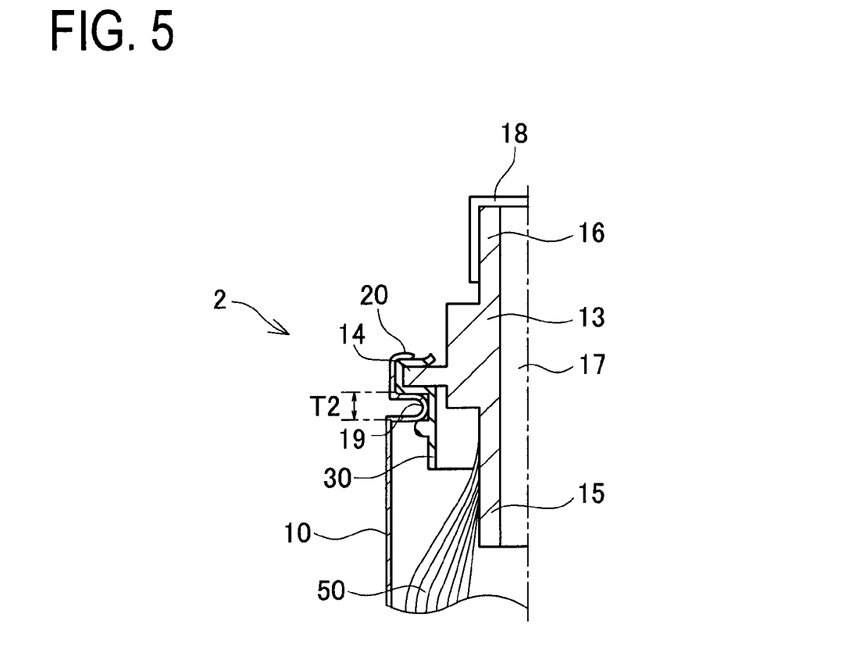
FIG. 5 is a sectional view showing a configuration of a cylindrical battery in a second embodiment.

A main part of a cylindrical battery in a second embodiment is shown in FIG. 5. The cylindrical battery 2 in FIG. 5 includes a gasket 30 instead of the gasket 21 in the cylindrical battery 1 in the first embodiment shown in FIG. 1. Other parts are identical to those in the first embodiment. The gasket 30 not yet mounted in the cylindrical battery 2 is shown in FIG. 6.

Figure 6:
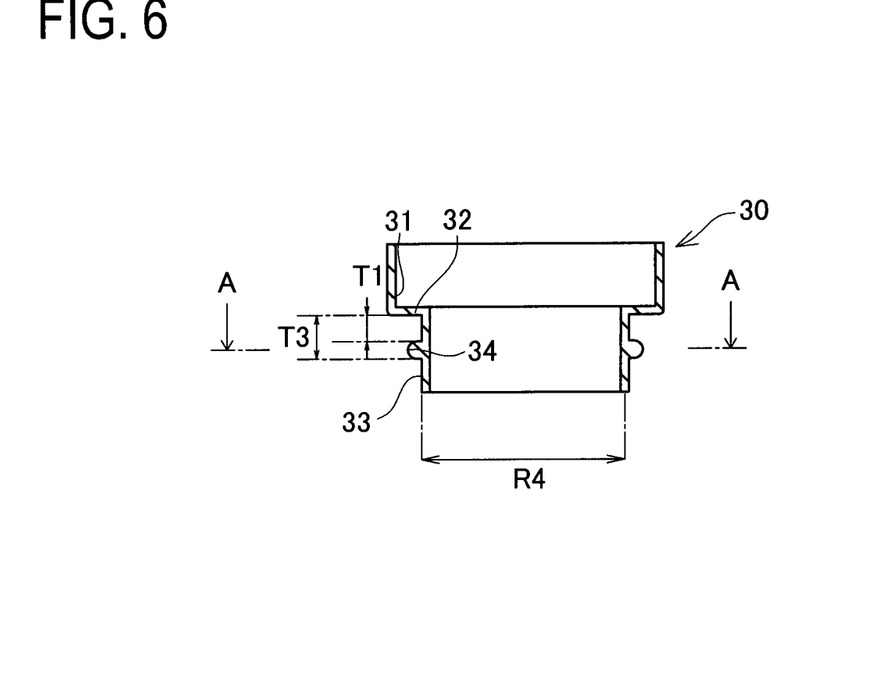
FIG. 6 is a sectional view showing a gasket in the cylindrical battery in FIG. 5.

The gasket 30 in FIG. 6 includes a large-diameter portion 31, a collar portion 32, and a small-diameter portion 33. The large-diameter portion 31 corresponds to the cylindrical portion 22 and the collar portion 24 in the first embodiment and the collar portion 32 corresponds to the collar portion 23 in the first embodiment. The small-diameter portion 33 is formed to extend downward in FIG. 6 from the inner periphery of the collar portion 32. That is, the small-diameter portion 33 is located more inside in an axial direction than the collar portion 32 when the gasket 30 is mounted in the cylindrical battery 2.

Figure 7:
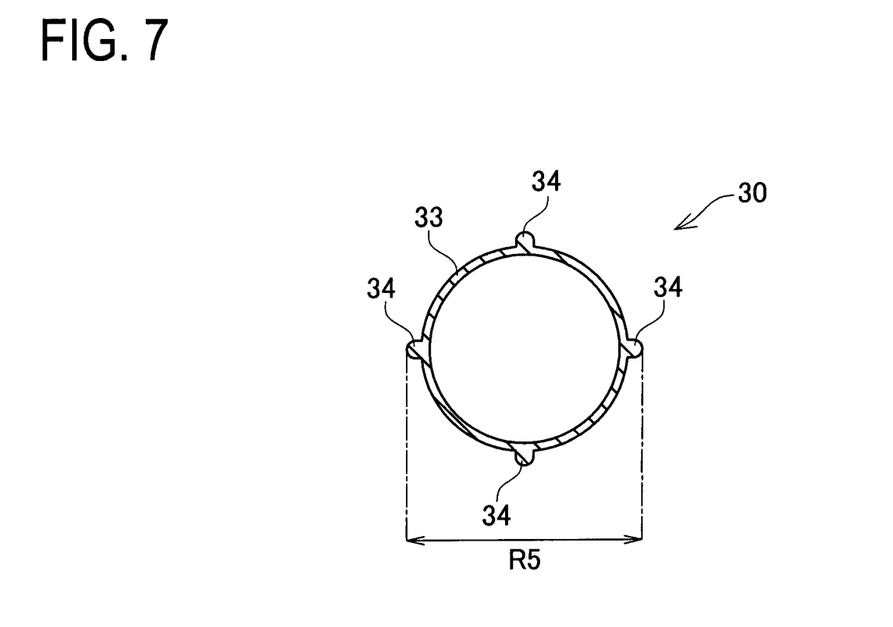
FIG. 7 is a sectional view of the gasket viewed from a different direction from that in FIG. 6.

Raised portions 34 are formed on the outer periphery of the small-diameter portion 33. The raised portions 34 are arranged discretely in a circumferential direction as shown in FIG. 7. FIG. 7 is a cross sectional view of the gasket 30 taken along a line A-A (passing through the top of the raised portion 34) in FIG. 6. When viewed in the circumferential direction, the gasket 30 has an uneven surface defined by portions formed with the raised portions 34 and other portions formed with no raised portions 34. The number of the raised portions 34 is arbitrarily determined. The shape of the raised portions 34 is not limited to a hemispherical shape as shown in the figure but may be selectively circular-conical, pyramidal, circular-columnar, rectangular-columnar, etc. Furthermore, the raised portions 34 do not have to be arranged completely discretely and may be formed in a circumferentially continuous shape on the condition that an uneven surface is provided.

In the gasket 30, an outer diameter R4 (see FIG. 6) of the small-diameter portion 33 is smaller than the inner diameter R3 (see FIG. 4) of the neck 19. An outer diameter R5 (see FIG. 7) of the raised portions 34 is larger than the inner diameter R3 of the neck 19. Interval T1 (see FIG. 6) between the collar portion 32 and an upper edge of each raised portion 34 is slightly smaller than thickness T2 (see FIG. 5) of the neck 19. Distance T3 from the collar portion 32 to a lower edge of each raised portion 34 in the figure is slightly longer than length T4 (see FIG. 8) of a portion of the cylindrical case 10 upper than the neck 19.

The cylindrical battery 2 in this embodiment is basically manufactured in the same manufacturing sequence as that in the first embodiment:

Temporary Sealing→Liquid Injection→Final Sealing

In this embodiment, however, the gasket 30 has to be mounted in the outer terminal member 13 in advance before the electrode wound body 50 is connected to the outer terminal member 13.

(Temporary Sealing)

Figure 8:
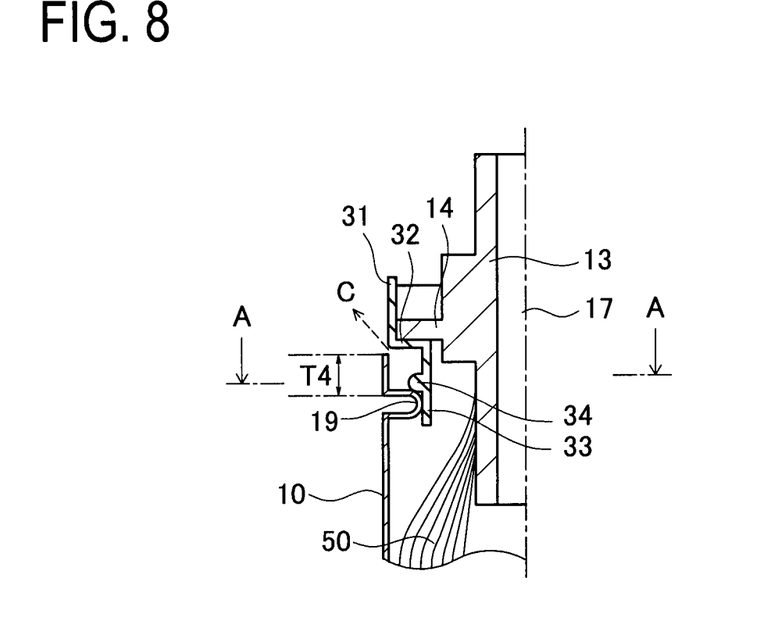
FIG. 8 is a sectional view showing a temporarily sealed state of the cylindrical battery in FIG. 5 in the manufacturing process.

FIG. 8 shows a temporarily sealed state in this embodiment. The state in FIG. 8 is a condition that the outer terminal member 13 is pushed into the cylindrical case 10 until the raised portions 34 of the gasket 30 make contact with the neck 19. In this state, the small-diameter portion 33 of the gasket 30 gets into the neck 19. The raised portions 34 are snagged and stopped on an upper part of the neck 19 in the figure because R5 is larger than R3 as mentioned above. At that time, if the outer terminal member 13 is strongly pushed in, the raised portions 34 are likely to go over the neck 19 because the gasket 30 is made of a flexible material which is deformable. However, at this moment, the outer terminal member 13 is not pushed ahead to that extent so that it is stopped in the state of FIG. 8.

Figure 9:
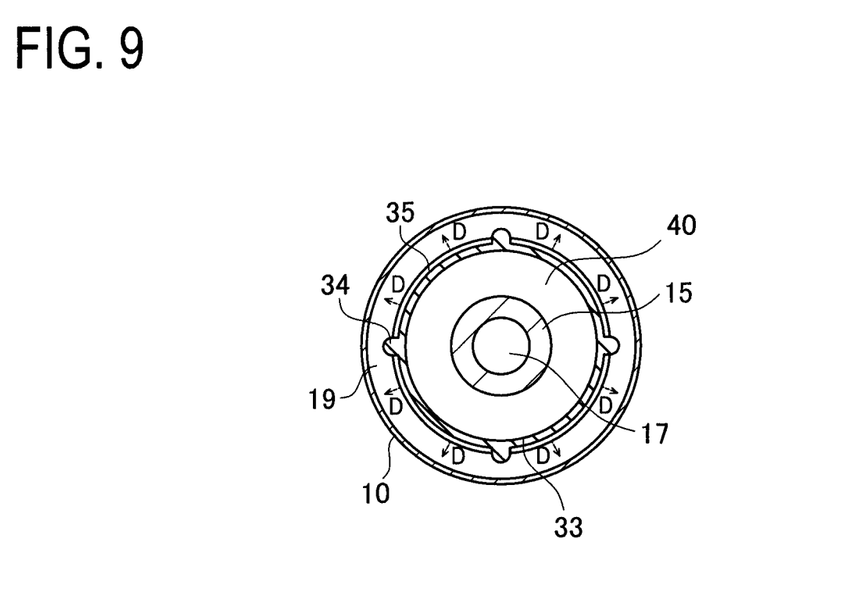
FIG. 9 is a sectional view of the cylindrical battery viewed from a different direction from that in FIG. 8.

In the state of FIG. 8, a clearance is present between the neck 19 and the small-diameter portion 33 (excepting the raised portions 34) of the gasket 30 because R4 is smaller than R3 as described above. This condition is shown in FIG. 9. FIG. 9 is a cross sectional view taken along a line A-A in FIG. 8 (passing through the top of the raised portion 34). From FIG. 9, it can be understood that clearances 35 exist between the small-diameter portion 33 excepting the places of the raised portions 34 and the neck 19. In the state of FIG. 8, a clearance (in a position indicated by a dashed arrow C) is also present between the upper end of the cylindrical case 10 and the large-diameter portion 31 of the gasket 30 because T3 is longer than T4 as mentioned above. This state is a temporarily sealed state in this embodiment.

(Liquid Injection)

Also in this embodiment, liquid injection is performed through the through hole 17 of the outer terminal member 13 in the temporarily sealed state. In this embodiment, the air existing in the cylindrical case 10 is escapes outside as indicated by dashed arrows D through the clearance 35 shown in FIG. 9. The air further escapes outside through the clearance between the cylindrical case 10 and the gasket 30 as indicated by the dashed arrow C in FIG. 8. In this way, the clearances serving as an air escaping path are reliably provided, thereby achieving an excellent air releasing property during liquid injection and enabling smooth liquid injection. Accordingly, the electrolyte impregnating ability between the electrode bands is also good.

(Final Sealing)

Figure 10:
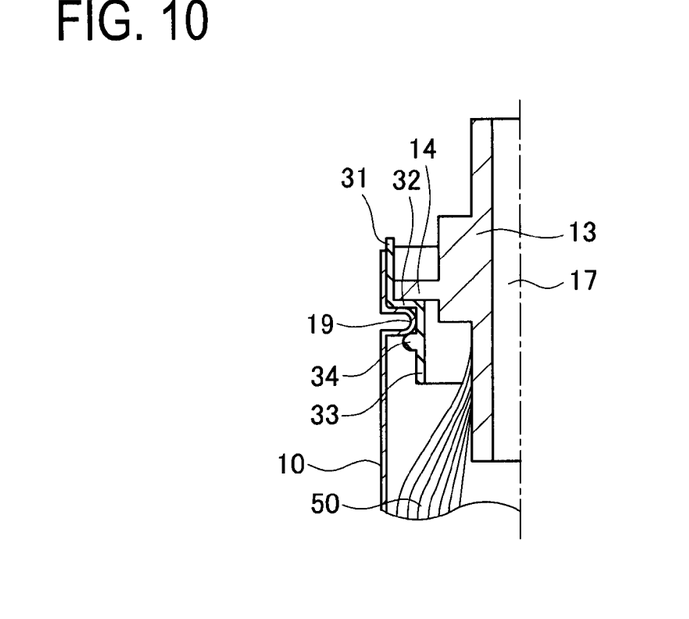
FIG. 10 is a sectional view showing an immediately preceding state to final sealing in the manufacturing process of the cylindrical battery in FIG. 5.

In this embodiment, after liquid injection and before bending, the outer terminal member 13 is strongly pushed in. Actually, the outer terminal member 13 has only to be pushed by an injection nozzle after the liquid injection. The gasket 30 is thus deformed, allowing the raised portions 34 to go over the neck 19 into a state shown in FIG. 10. In the state of FIG. 10, the raised portions 34 are located just below the neck 19 in the figure. In other words, the neck 19 is positioned between the raised portions 34 and the collar portion 32. The collar portion 32 of the gasket 30 is sandwiched between a lower surface of the flange 14 of the outer terminal member 13 in the figure and an upper surface of the neck 19 in the figure. In addition, the large-diameter portion 31 of the gasket 30 is sandwiched between a periphery surface of the flange 14 and an inner surface of the portion of the cylindrical case 10 upper than the neck 19.

Successively, the upper end of the cylindrical case 10 is bent radially inward for. As shown in FIG. 5, the bent portion 20 at the upper end of the cylindrical case 10 presses the large-diameter portion 31 of the gasket 30 against the upper surface of the flange 14 of the outer terminal member 13 in the figure. In this way, the final sealing is finished. The cap 18 is then attached to complete the cylindrical battery 2 in this embodiment.

Herein, the presence of the raised portions 34 provides the following effects during a bending operation. In this bending operation, the large-diameter portion 31 of the gasket 30 is folded radially inward. Under the influence of deformation of this gasket 30, stress is applied on the small-diameter portion 33 to reversely widen radially outward. This stress acts in the direction to reduce the thickness of the collar portion 32 of the gasket 30 and others and lower the sealing property. In this embodiment, however, the presence of the raised portions 34 prevents outward deformation of the small-diameter portion 33 because the raised portions 34 are in contact with the neck 19. Consequently, this embodiment prevents the lowering of the sealing property caused by the stress in the bending operation.

In this embodiment, as explained above in detail, the small-diameter portion 33 is provided at a position more inside in the axial direction than the collar portion 32 of the gasket 30. It is also arranged such that the clearance 35 is generated between the outer surface of the small-diameter portion 33 and the neck 19. Further, the raised portions 34 which will be snagged on the neck 19 are arranged discretely on the outer surface of the small-diameter portion 33. In a state where the gasket 30 is pushed until the raised portions 34 make contact with the neck 19, another clearance is also generated between the upper end of the cylindrical case 10 and the gasket 30. In addition to the effects in the first embodiment, accordingly, the clearances serving as the air escaping path during liquid injection are reliably provided. The lowering of the sealing property by the stress in bending is further prevented. Consequently, the cylindrical battery 2 having a cylindrical form and the manufacturing method thereof can be realized with both excellent liquid injection property and productivity.

In the above embodiment, the neck 19 is formed continuously in the circumferential direction and the raised portions 34 are formed discretely. As an alternative, they may be provided in reversed forms. Specifically, necks 19 are formed discretely and a raised portion 34 is formed continuously in the circumferential direction. In this configuration, the air escaping path can be similarly provided. This can also provide an effective measure against stress in the bending operation. Another alternative is to arrange both necks 19 and raised portions 34 discretely and in such a form as that they are snagged on each other in the temporarily sealing state.

Third Embodiment

Figure 11:
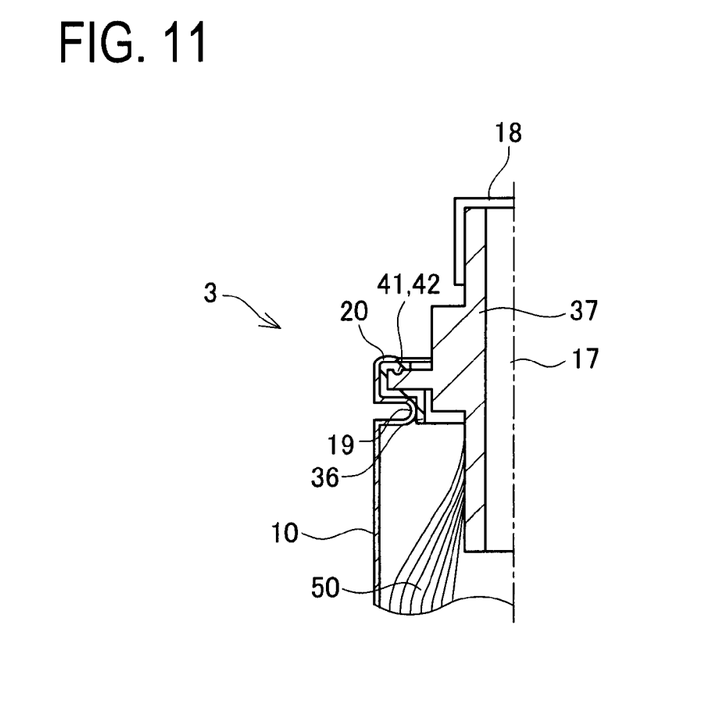
FIG. 11 is a sectional view showing a configuration of a cylindrical battery in a third embodiment.
Figure 12:
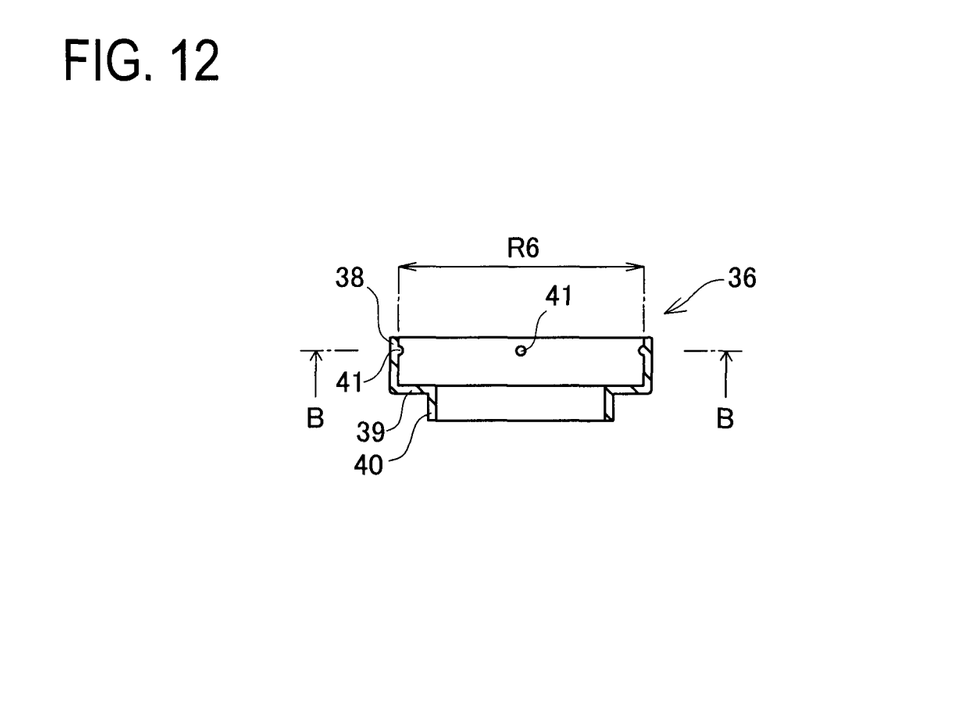
FIG. 12 is a sectional view showing a gasket in the cylindrical battery in FIG. 11.

A main part of a cylindrical battery in a third embodiment is shown in FIG. 11. A cylindrical battery 3 in FIG. 11 includes a gasket 36 instead of the gasket 30 in the cylindrical battery 2 in the second embodiment shown in FIG. 5 and further an outer terminal member 37 instead of the outer terminal member 13. Other parts are identical to those in the second embodiment. FIG. 12 shows the gasket 36 in a state before being mounted in the cylindrical battery 3.

Figure 13:
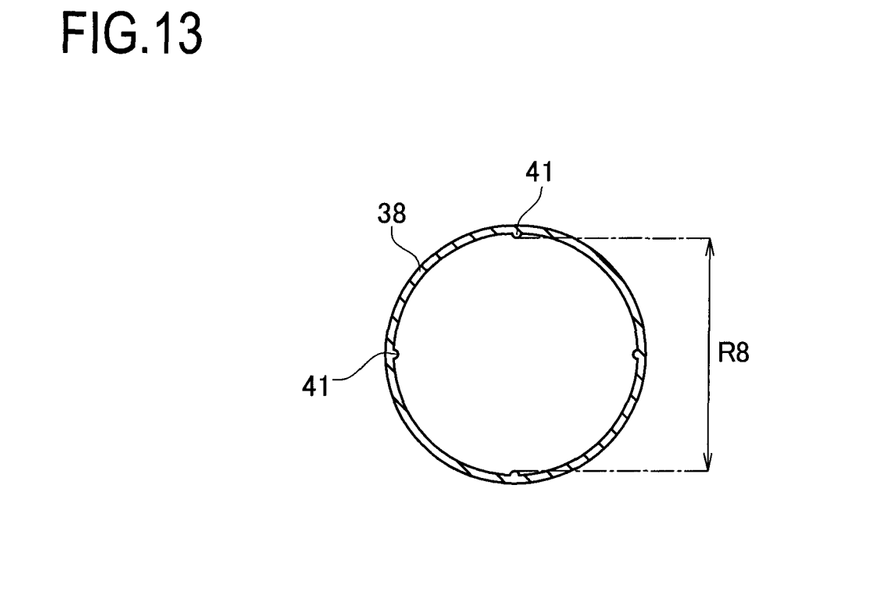
FIG. 13 is a sectional view of the gasket viewed from a different direction from that in FIG. 12.

The gasket 36 in FIG. 12 includes a large-diameter portion 38, a collar portion 39, and a small-diameter portion 40. The large-diameter portion 38 corresponds to the large-diameter portion 31 in the second embodiment, the collar portion 39 corresponds to the collar portion 32 in the second embodiment, and the small-diameter portion 40 corresponds to the small-diameter portion 33 in the second embodiment. The gasket 36 in this embodiment differs from the gasket 30 in the second embodiment in that the small-diameter portion 40 is not provided with the raised portions 34 but the large-diameter portion 38 is provided with raised portions 41 on an inner surface. The raised portions 41 are arranged discretely in a circumferential direction as shown in FIG. 13. FIG. 13 is a cross sectional view taken along a line B-B in FIG. 12 (passing through the top of the raised portion 41). The raised portions 41 may be variously modified as with the raised portions 34 in the second embodiment.

Figure 14:
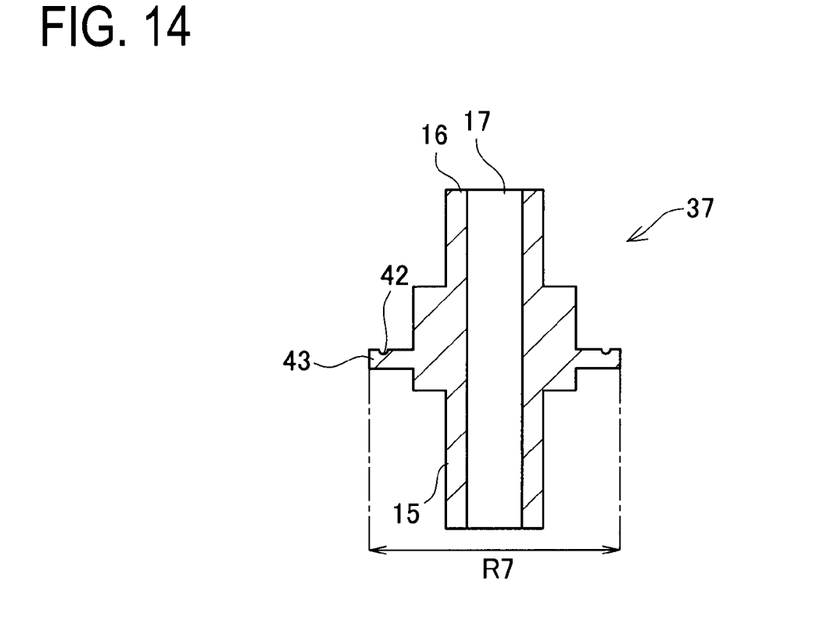
FIG. 14 is a sectional view showing a terminal member in the cylindrical battery in FIG. 12.

The outer terminal member 37 is singly shown in FIG. 14. The outer terminal member 37 in FIG. 14 is different from the outer terminal members 13 in the first and second embodiments in only that recesses 42 are formed. The recesses 42 are formed discretely on an upper surface of a flange 43. The recesses 42 are arranged in positions in which the raised portions 41 will fit when the cylindrical case 10 and the gasket 36 are bent as shown in FIG. 11.

In the gasket 36, an inner diameter R6 of the large-diameter portion 38 (see FIG. 12) is larger than an outer diameter R7 of the flange 43 (see FIG. 12). An inner diameter R8 of the raised portions 41 (see FIG. 13) is smaller than the outer diameter R7 of the flange 43.

The cylindrical battery 3 in this embodiment is manufactured in the same manufacturing sequence to those in the first and second embodiments:
Temporary Sealing→Liquid Injection→Final Sealing
In this embodiment also, the gasket 36 has to be assembled with the outer terminal member 37 in advance before the electrode wound body 50 is connected to the outer terminal member 37. However, the gasket 36 has to be held so that the flange 43 does not go over the raised portions 41.

(Temporary Sealing)

Figure 15:
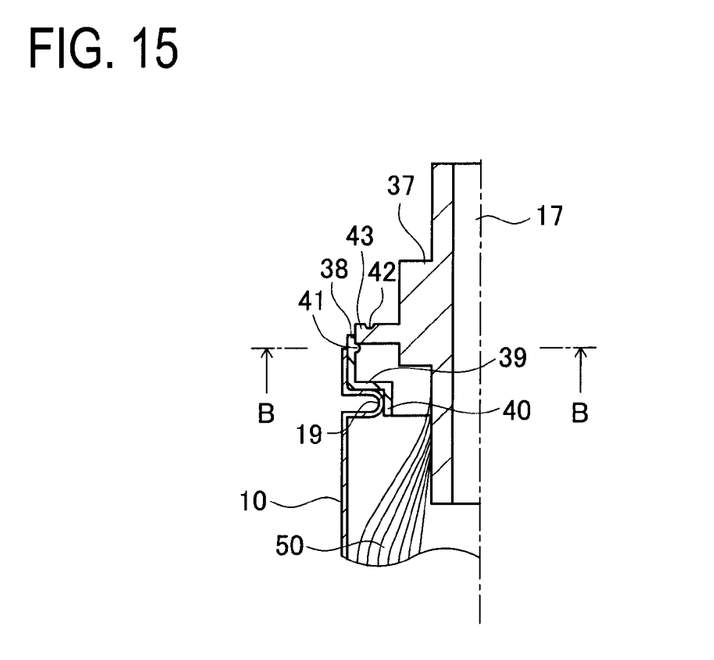
FIG. 15 is a sectional view showing a temporarily sealed state of the cylindrical battery in FIG. 11 in the manufacturing process.

FIG. 15 shows a temporarily sealed state in this embodiment. The state in FIG. 15 is a condition that the outer terminal member 37 is pushed into the cylindrical case 10 until the flange 43 makes contact with the raised portions 41 of the gasket 36. In this state, the small-diameter portion 40 of the gasket 36 gets into the neck 19. The flange 43 is snagged and stopped on upper sides of the raised portions 41 in the figure because R7 is larger than R8 as mentioned above. At that time, if the outer terminal member 37 is strongly pushed in, the flange 43 is likely to go over the raised portions 41. However, at this moment, the outer terminal member 37 is stopped in the state of FIG. 15 without being pushed ahead to that extent. It is to be noted that the recesses 42 of the flange 43 are arranged in the circumferential positions corresponding to the raised portions 41.

Figure 16:
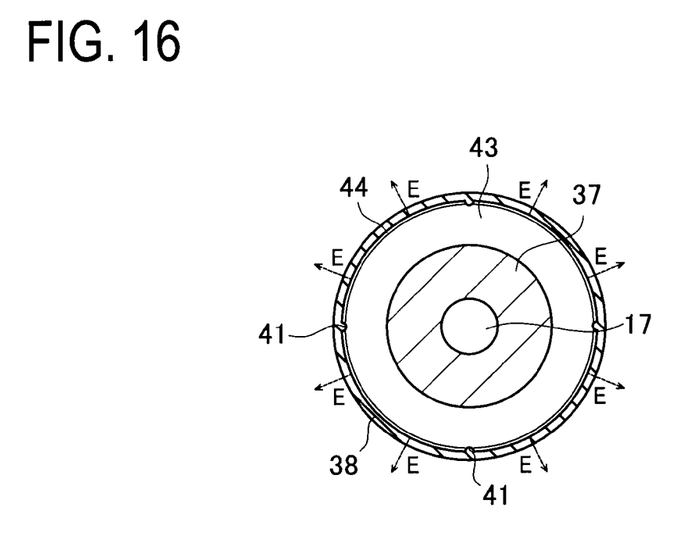
FIG. 16 is a sectional view of the cylindrical battery viewed from a different direction from that in FIG. 15.

In the state of FIG. 15, a clearance is present between an inner surface of the large-diameter portion 38 (excepting the raised portions 41) of the gasket 36 and the flange 43 because R7 is smaller than R6 as mentioned above. This condition is shown in FIG. 16. FIG. 16 is a cross sectional view taken along a line B-B in FIG. 15 (passing through the top of the raised portion 41). From FIG. 16, it can be understood that clearances 44 exist between the large-diameter portion 38 excepting the places of the raised portions 41 and the flange 43. Such a state is a temporarily sealed state in this embodiment.

(Liquid Injection)

In this embodiment also, liquid injection is performed through the through hole 17 of the outer terminal member 37 in the temporarily sealed state. In this embodiment, the air existing in the cylindrical case 10 escapes outside through the clearance 44 as indicated by dashed arrows E in FIG. 16. In this way, the air escaping path is provided, thereby enabling smooth liquid injection. The electrolyte impregnating ability between the electrode bands is also good.

(Final Sealing)

Figure 17:
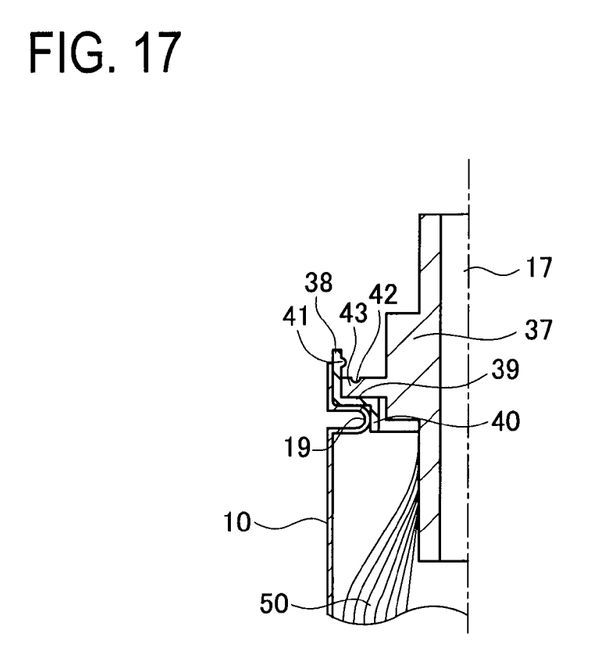
FIG. 17 is a sectional view showing an immediately preceding state to final sealing in the manufacturing process of the cylindrical battery in FIG. 11.

In this embodiment also, after liquid injection and before bending, the outer terminal member 37 is strongly pushed in by an injection nozzle. The gasket 36 is thus deformed, allowing the flange 43 to go over the raised portions 41 into a state shown in FIG. 17. In the state of FIG. 17, the flange 43 is located just below the raised portions 41 in the figure. In other words, the flange 43 is positioned between the raised portions 41 and the collar portion 39. Further, the collar portion 39 of the gasket 36 is sandwiched between a lower surface of the flange 43 of the outer terminal member 37 in the figure and an upper surface of the neck 19 in the figure. The large-diameter portion 38 of the gasket 36 is sandwiched between the periphery surface of the flange 43 and an inner surface of an upper portion of the cylindrical case 10 than the neck 19.

Successively, the upper end of the cylindrical case 10 is bent radially inward. As shown in FIG. 11, the bent portion 20 at the upper end of the cylindrical case 10 presses the large-diameter portion 38 of the gasket 36 against the upper surface of the flange 43 of the outer terminal member 37 in the figure. In this way, the final sealing is finished. At that time, the raised portions 41 of the large-diameter portion 38 fit in the recesses 42 of the flange 43, thereby holding the outer terminal member 37 against rotation. The cap 18 is then attached to complete the cylindrical battery 3 in this embodiment.

In this embodiment described above in detail, the gasket 36 is provided with the large-diameter portion 38 more outside than the collar portion 39 in the axial direction. It is arranged such that the clearance 44 is generated between the large-diameter portion 38 and the flange 43. Further, the raised portions 41 on which the flange 43 will be snagged are arranged discretely on the inner surface of the large-diameter portion 38. In this way, similar to the second embodiment, the clearance serving as the air escaping paths during liquid injection are reliably provided. Moreover, engagement between the raised portions 41 and the flange 43 by bending prevents rotation. Consequently, the cylindrical battery 3 having a cylindrical form and the manufacturing method thereof can be realized with both excellent liquid injection property and productivity.

In the above embodiment also, the outer periphery of the flange 43 may be circumferentially uneven and the raised portions 41 may be circumferentially continuous. This configuration can also provide the similar air escaping paths. As an alternative, both the flange 43 and the raised portions 41 are configured in circumferentially uneven form so that they are snagged on each other at the time of temporary sealing. In this embodiment, the gasket 36 does not always have to be provided with the small-diameter portion 40. The small-diameter portion 40 if provided may be formed with the raised portions 34 as in the second embodiment. This configuration can achieve an effective measure against stress during bending as in the second embodiment. The effect of preventing rotation by the protrusions and the recesses in this embodiment can also be applied to the configuration in the first or second embodiment. In this case, it may be arranged such that a gasket is formed with recesses while a flange is formed with protrusions.

The aforementioned embodiments are merely examples and provide no limitation on the present invention. Thus, the present invention may be embodied in other specific forms without departing from the essential characteristics thereof.

REFERENCE SIGNS LIST 1, 2, 3 Cylindrical battery
10 Cylindrical case
13, 37 Outer terminal member
14, 43 Flange
17 Through hole (Liquid port)
19 Neck (First protrusion)
20 Bent portion (Bent portion)
21, 30, 36 Gasket (Seal member)
22 Cylindrical portion (Large-diameter cylindrical portion)
23, 32, 39 Collar portion
24 Collar portion
29 Upper end portion of cylindrical case
31, 38 Large-diameter portion (Large-diameter cylindrical portion)
33 Small-diameter portion (Small-diameter cylindrical portion)
34, 41 Raised portion (Second protrusion, Third protrusion)
35, 44 Clearance
42 Recess (Engagement configuration)
50 Winding electrode body

The invention claimed is:

1. A cylindrical battery comprising a power generating element constituted of a positive electrode band and a negative electrode band wound in a columnar shape and contained in a cylindrical case, a terminal member connected to one of the electrode bands of the power generating element, and a flexible seal member that seals the clearance between the cylindrical case and the terminal member while insulating the cylindrical case from the terminal member, the terminal member and the seal member being arranged at one end of the cylindrical case and the terminal member being placed to extend through the seal member in an axial direction, wherein
the cylindrical case is formed with a first protrusion on an inner surface,
the terminal member is formed with a flange on a side surface located more outside in an axial direction than the first protrusion, the flange having an outer diameter larger than an inner diameter of the first protrusion, and an injection port extending through in the axial direction of the cylindrical case,
the seal member includes:
a large-diameter cylindrical portion located between the inner surface of the cylindrical case more outside in the axial direction than the first protrusion and a periphery surface of the flange;
a collar portion formed to continuously extend radially inward from the large-diameter cylindrical portion and located between a surface of the first protrusion located outside in the axial direction and a surface of the flange located inside in the axial direction; and
a second protrusion having a smaller inner diameter than the outer diameter of the flange, the second protrusion being arranged on an inner surface of the large-diameter cylindrical portion at a position more outside in the axial direction than the flange,
the flange is formed, on an axially outside surface, with an engagement configuration engageable with the second protrusion,
a portion of the cylindrical case located on an end side relative to the first protrusion is bent so that the bent portion folds and presses a part of the large-diameter cylindrical portion against the flange to make the second protrusion engage with the engagement configuration and seal the one end of the cylindrical case, and
the flange and the second protrusion have shapes allowing partial contact with each other when the seal member is moved in the axial direction of the cylindrical case before the cylindrical case is bent and also forming a clearance partially even when they are in contact with each other.

2. The cylindrical battery according to claim 1, wherein the seal member includes:
a small-diameter cylindrical portion having a smaller diameter than the large-diameter cylindrical portion, the small-diameter cylindrical portion being formed to continuously extend from the collar portion inward in the axial direction of the cylindrical case, and
a third protrusion having a larger outer diameter than the inner diameter of the first protrusion, the third protrusion being arranged on an outer surface of the small-diameter cylindrical portion at a position more inside in the axial direction than the first protrusion,
a part of the large-diameter cylindrical portion is folded and pressed against the flange by the bent portion,
at least one of the first protrusion and the third protrusion is formed and pressed in a circumferentially uneven shape, and
the first protrusion and the third protrusion have shapes allowing partial contact with each other when the seal member is moved in the axial direction of the cylindrical case and also forming a clearance partially even when they are in contact with each other.

3. A method of manufacturing a cylindrical battery comprising a power generating element constituted of a positive electrode band and a negative electrode band wound in a columnar shape and contained in a cylindrical case, a terminal member connected to one of the electrode bands of the power generating element, and a flexible seal member that seals the clearance between the cylindrical case and the terminal member while insulating the cylindrical case from the terminal member, the terminal member and the seal member being arranged at one end of the cylindrical case and the terminal member being placed to extend through the seal member in an axial direction, wherein
the method uses the:
the cylindrical case formed with a first protrusion on an inner surface,
the terminal member formed with a flange on a side surface located more outside in the axial direction than the first protrusion, the flange having an outer diameter larger than an inner diameter of the first protrusion, and an injection port extending through in the axial direction of the cylindrical case, and
the seal ember including:
a large-diameter cylindrical portion to be located between the inner surface of the cylindrical case more outside in the axial direction than the first protrusion and a periphery surface of the flange,
a collar portion formed to continuously extend radially inward from the large-diameter cylindrical portion,
a small-diameter cylindrical portion having a smaller diameter than the large-diameter cylindrical portion, the small-diameter cylindrical portion being formed to continuously extend from the collar portion inward in the axial direction of the cylindrical case, and
a second protrusion having a larger outer diameter than the inner diameter of the first protrusion, the second protrusion being arranged on an outer surface of the small-diameter cylindrical portion and at a position more inside in the axial direction than the first protrusion when the collar portion makes contact with a surface of the first protrusion located outside in the axial direction,
at least one of the first protrusion and the second protrusion is formed in a circumferentially uneven shape,
the method includes:
when the terminal member is to be mounted in an opening of the cylindrical case at an end,
placing the seal member between the cylindrical case and the terminal member so that the collar portion is located between a surface of the first protrusion located outside in the axial direction and a surface of the flange located inside in the axial direction and the large-diameter cylindrical portion is located between the inner surface of the cylindrical case and the periphery surface of the flange,
pushing the terminal member axially inward until the second protrusion makes contact with the first protrusion,
injecting electrolyte in the cylindrical case in that state through the injection port while discharging air through a clearance between the second protrusion and the first protrusion,
further pushing the terminal member axially inward after injection to make the second protrusion and the first protrusion to go over each other, and
bending a portion of the cylindrical case located on an end side relative to the first protrusion to the inner surface side so that a bent portion folds a part of the large-diameter cylindrical portion of the seal member to press against the flange to seal the one end of the cylindrical case.

4. A method of manufacturing a cylindrical battery comprising a power generating element constituted of a positive electrode band and a negative electrode band wound in a columnar shape and contained in a cylindrical case, a terminal member connected to one of the electrode bands of the power generating element, and a flexible seal member that seals the clearance between the cylindrical case and the terminal member while insulating the cylindrical case from the terminal member, the terminal member and the seal member being arranged at one end of the cylindrical case and the terminal member being placed to extend through the seal member in an axial direction, wherein
the method uses:
the cylindrical case formed with a first protrusion on an inner surface,
the terminal member formed with a flange on a side surface located more outside in the axial direction than the first protrusion, the flange having an outer diameter larger than an inner diameter of the first protrusion, and an injection port extending through in the axial direction of the cylindrical case, and
the seal member including:
a large-diameter cylindrical portion to be located between the inner surface of the cylindrical case more outside in the axial direction than the first protrusion and a periphery surface of the flange,
a collar portion formed to continuously extend radially inward from the large-diameter cylindrical portion, and
a second protrusion having a smaller inner diameter than the outer diameter of the flange, the second protrusion being arranged on an inner surface of the large-diameter cylindrical portion at a position which will be more outside in the axial direction than the flange when the surface of the flange located inside in the axial direction makes contact with the collar portion,
at least one of the flange and the second protrusion is formed to be uneven in a circumferential direction, and
the method includes:
when the terminal member is to be mounted in an opening of the cylindrical case at an end,
placing the seal member between the cylindrical case and the terminal member so that the collar portion is located between a surface of the first protrusion located outside in the axial direction and a surface of the flange located inside in the axial direction and the large-diameter cylindrical portion is located between the inner surface of the cylindrical case and the periphery surface of the flange,
pushing the terminal member axially inward until the flange makes contact with the second protrusion,
injecting electrolyte in the cylindrical case in that state through the injection port while discharging air through a clearance between the flange and the second protrusion,
further pushing the terminal member axially inward after injection to make the flange and the second protrusion to go over each other, and
bending a portion of the cylindrical case located on an end side relative to the first protrusion to the inner surface side so that a bent portion folds a part of the large-diameter cylindrical portion of the seal member to press against the flange to seal the one end of the cylindrical case.

5. The method of manufacturing a cylindrical battery according to claim 4, wherein the second protrusion is formed to be uneven in the circumferential direction, the method uses the terminal member formed, on an axially outside surface, with an engagement configuration engageable with the second protrusion, and the method includes bending the cylindrical case to make the second protrusion engage with the engagement configuration.

\* \* \* \* \*